June 5, 1956  H. M. STUELAND  2,748,960
PARKING STAND FOR TRACTOR-IMPLEMENT COMBINATION
Filed Oct. 7, 1953  2 Sheets-Sheet 1

INVENTOR.
H. M. STUELAND
ATTORNEYS

June 5, 1956  H. M. STUELAND  2,748,960
PARKING STAND FOR TRACTOR-IMPLEMENT COMBINATION
Filed Oct. 7, 1953  2 Sheets-Sheet 2

INVENTOR.
H. M. STUELAND
ATTORNEYS

United States Patent Office 2,748,960
Patented June 5, 1956

2,748,960

PARKING STAND FOR TRACTOR-IMPLEMENT COMBINATION

Harold M. Stueland, East Moline, Ill., assignor to Deere & Company, Moline, Ill., a corporation of Illinois Application October 7, 1953, Serial No. 384,584

6 Claims. (Cl. 214—131)

This invention relates to a parking stand for a tractor-implement combination and more particularly to a stand having such characteristics as to facilitate the mounting and dismounting of the implement as respects the tractor.

One of the characteristics in almost all designs of implements intended for use with a tractor is the adaptation of the implement in varying degrees to the facility with which the implement may be mounted on and dismounted from the tractor. The purpose of this consideration in the design is to enable use of the tractor with or without the implement, thus increasing the range of utility of the tractor over that of a machine in which the implement is either a component part or could be removed only with extreme difficulty. It is therefore a common expedient in tractor-implement design to provide, for mounted as distinguished from drawn implements, connecting or mounting means of the so-called drive-in, drive-out type. In a design of this nature, the implement is supported in some fashion or other so that it may be approached by the tractor. In some cases, the tractor is driven forwardly and in other cases the tractor is backed. The supporting portions of the implement are so arranged as to afford little or no interference with the tractor as it moves into position. In some cases, the tractor can drive over certain of the supporting parts, and in some cases additional parts must be used to effect the connection. It is common, in a large majority of the cases, to support the implement from the ground so that the tractor may be driven into position.

According to the present invention, a novel parking stand is utilized for supporting an implement in dismounted position, but this stand comprises certain improvements over known supporting means, in that it includes a base and a pair of spaced supports thereon for sustaining the detached implement substantially at the operating level that the implement assumes when mounted on the tractor. One of the supporting means holds the implement against upward displacement and the other supporting means maintains the operating level of the dismounted implement, the first means serving as an anchor so that the dismounted implement cannot tilt. The parking stand is designed primarily for that type of tractor-implement comprising a tractor-mounted material loader. The loader comprises a U-shaped frame adapted to embrace the tractor from the front and on this frame is pivoted the rear end of lift means, which means projects forwardly and ahead of the U-shaped frame structure to support a tilting bucket. Selectively adjustable and lockable adjusting means is cooperative between the frame structure and the lift means for raising and lowering the lift means relative to the frame structure. The adjusting means may be conventional hydraulic motors deriving power in the first instance from the tractor. When the implement is in the process of being dismounted, the power means may be used to adjust the lift means relative to the frame to thereby relieve certain of the attaching parts of strain, thus facilitating removal of the attaching parts.

Another feature of the invention is the arrangement of the frame-receiving supporting means in such manner that as the tractor is driven into position, with the loader mounted thereon, the supporting means is slightly elevated, thereby removing other attaching parts of the weight of the implement so that the attaching parts may be readily removed.

It is a feature of the invention that the parking stand is simply constructed of relatively few parts requiring little if any maintenance. Adequate adjustments are provided for accommodating variations in operating and parking conditions.

The foregoing and other important objects and desirable features inherent in and encompassed by the invention will become apparent from the following detailed description and accompanying sheets of drawings in which Fig. 1 is a perspective view of a tractor-mounted loader, the loader being illustrated in a partly raised position.

Figure 1:
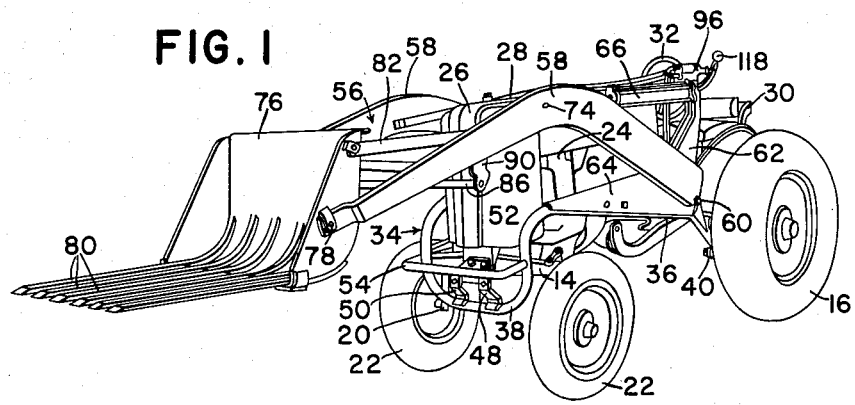

The tractor-implement combination or organization chosen for purposes of illustration is in many respects not unconventional; although, there are certain details that adapt the unit for use with the particular parking stand based on a preferred embodiment of the invention. The tractor-loader forms the subject matter of applicant's copending application Serial No. 218,105, filed March 29, 1951, and the machine will be described only generally, or at least to the extent deemed sufficient to orient the use of the loader with the parking stand.

The basic vehicle or tractor is of a well-known type comprising a longitudinal main body 10 having a rear axle structure 12 and a transverse front axle structure 14. The rear axle structure is supported on a pair of relatively large traction wheels 16 by means of depending housings 18 and the front axle structure 14 is of the conventional arched type having upright spindles 20 to the lower ends of which are respectively journaled front wheels 22. The body includes a forwardly located internal combustion engine 24 at least partly enclosed in a well-known fashion by a radiator grille structure 26 and a rearwardly extending longitudinal hood 28. An operator's seat 30 is carried at the rear of the tractor and ahead of this seat is a steering wheel 32 for steering the tractor front wheels.

The implement, which is here a material loader, comprises a rearwardly facing U-shaped frame structure, designated generally by the numeral 34. This frame or support has a pair of longitudinal side members 36 and a transverse support member or bight 38. Each of the depending housings 18 of the tractor rear axle structure 12 has affixed thereto a forwardly extending bracket or mounting means 40 and each bracket is removably secured to the rear end of the associated frame side member 36, as by a pair of bolts 42. Each bracket is apertured at 44 (Fig. 7) and the associated end of each side member 36 is apertured at 46 (Fig. 3) to receive these bolts.

The bight or front transverse member 38 of the frame 34 has rigidly secured thereto an upstanding bracket or attaching means 48 which is removably mounted on a front body portion 50 of the tractor by removable or detachable securing means, here in the form of a pair of cap screws 52. A bumper 54 forms part of the forward end of the frame structure but is not important to the mounting and dismounting of the loader frame as respects the tractor.

When the loader frame is in mounted position (Fig. 2) it is supported at its front and rear ends by the detachable securing means just described and in such position is at what may be termed an operating level clear of the ground. The U-shaped nature of the frame enables the frame to embrace the tractor from the front so that the tractor may be driven forwardly into the frame or rearwardly out of the frame and the frame does not in any way interfere with the progress of the tractor in either direction during mounting or dismounting.

Another basic part of the loader is the lift means, designated generally by the numeral 56, and comprising a pair of fore-and-aft extending lift arms or beams 58, one at each side of the tractor. Each lift arm is pivoted at its rear end at 60 on a transverse axis to a rear portion of the frame structure 34. The pivotal mounting is effected by an upright rigid member 62 secured, as by welding along its lower edge, to the associated frame member 36 and adequately braced by a forwardly and downwardly sloping triangular brace 64.

The lift means, comprising the lift arms 58, may be adjusted or raised and lowered about the transverse axis through the two pivot means 60 by selectively adjustable and lockable adjusting means, here in the form of a pair of hydraulic motors 66. Each motor comprises a cylinder 68 pivotally connected at 70 to an upper portion of the upright support 62 and having a forwardly extending piston rod 72 connected at its free end at 74 to an intermediate portion of the associated lift arm 58.

A selectively tiltable and lockable bucket 76 is pivotally supported on a transverse axis at 78 between the forward or front ends of the lift arms 58. This bucket includes a plurality of forwardly projecting tines 80 and is normally maintained in a loading position (Figs. 1 and 2) by overcenter mechanism comprising links 82 connected to arms 84 that are in turn connected to a rockshaft 86. This rockshaft extends transversely of the lift arms 58 adjacent their forward ends and is appropriately journaled in brackets 90 secured to the lift arms. An upright operating arm 92 is secured to the rockshaft and has its upper end connected by a rearwardly extending link 94, the rear end of which is connected to the upright support 62 at 70 along with the hydraulic motor 66. The purpose of the linkage 92—94 is to stabilize the bucket during raising and lowering. The bucket may be released for tilting by any suitable means (not shown here) for breaking the overcenter lock established by the linkage and arms 82—84. Since this structure is not important, except to the extent that it illustrates a representative means for locking and releasing the bucket, it is not described in detail.

The hydraulic motor 66 at the left-hand side of the tractor (Figs. 1 and 7) has a hydraulic valve 96 mounted thereon. This valve may be of any conventional construction and is therefore illustrated only generally. The purpose of the valve is, of course, to control the flow of fluid to and from the motors 66. Fluid pressure is developed by a pump (not shown) driven by the tractor engine 24 in any well-known manner, and the pump communicates with a high-pressure line 98 (Fig. 7) which has a releasable coupling 100 for connection conventionally to a conduit 102 which in turn is normally connected to hydraulic power mechanism contained in a housing 104 furnished as part of the standard equipment on the particular tractor illustrated here. The mechanism in the housing 104 may be of the type shown in the U. S. patent to Worstell 2,477,710 and actually forms no part of the present invention, except to the extent that the hydraulic system utilizes the reservoir of the housing 104 when the loader is mounted on the tractor. Likewise, the pressure line 102, when the loader is used on the tractor, is disconnected from the housing 104 and is coupled at 106 to a conduit 108 that supplies fluid under pressure to the control valve 96.

In the particular case, the mounting of the valve 96 on the left-hand hydraulic motor 66 includes an internal passage (not shown, because deemed unimportant here) that leads to the upper end of the motor; that is, the end above or to the rear of the piston (not shown) associated with the rod 72. Accordingly, when fluid is supplied through the valve 96 via the lines 102 and 108, the motor is extended for lowering of the lift means 56. Of course, the weight of the loader would be sufficient to cause it to move from a raised to a lowered position, but it is nevertheless deemed preferable to use a two-way motor as distinguished from a one-way motor. However, these details are unimportant and are described merely because they are part of the basic loader structure.

There is also built into the left-hand motor 66 a fluid passage (not shown) that leads to the forward or lower end of the piston, and when the valve supplies fluid through this passage, the motor is retracted to cause raising of the lift means. The valve is connected to the right-hand motor 66 by a pair of conduits 110 and 112 so that the motors 66 operate in parallel. Fluid exhausted from either end of the motor 66 is returned by a reservoir line 114 to the reservoir in the housing 104, the conduit 114 being connected to the housing by a detachable coupling 116.

From the description thus far, it will be seen that the control valve 96 is utilized to transmit fluid under pressure to one end or the other of each of the motors 66, in parallel, to raise and lower or otherwise adjust the position of the loader 56 and bucket 76. A convenient control handle 118 is illustrated as one means for adjusting the valve 96. In operation, the tractor-mounted loader is driven forwardly, with the bucket lowered, into a pile of material until the bucket is filled, after which the tractor is backed and maneuvered to an unloading position. The linkage 82—84 is tripped to cause the bucket to tilt and discharge its load, all in a conventional manner. When empty the bucket returns to the position of Fig. 2, which is here achieved by building the bucket so that a greater portion of its weight is behind the pivot 78.

The parking stand for use in mounting and dismounting the loader comprises a base 120 made up of a pair of fore-and-aft extending side members 122 rigidly cross-connected and held in transversely spaced relation by front, rear and intermediate cross members 124, 126 and 128 respectively. The front of the base 120 is provided with first means for receiving the implement part (bucket 76) as the first step in dismounting the loader. This means comprises a pair of hooked or loop-shaped elements 130 adapted to receive the outermost pair of tines 80 on the bucket 76. Thus, these loops constitute rearwardly facing means for receiving the tines as the tractor-mounted loader is driven forwardly over the stand or base 120.

Figure 4:
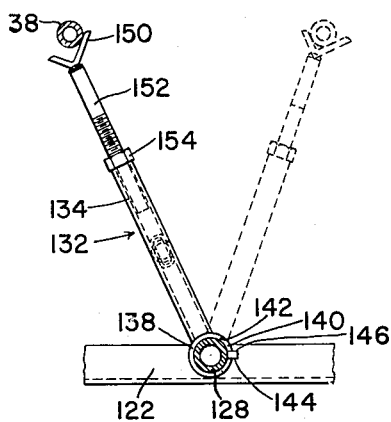
Fig. 4 is a fragmentary view on an enlarged scale showing in full lines and in dotted lines the initial and ultimate positions of the frame-receiving supporting means on the stand.

Spaced rearwardly of the first means 130 is a second means, designated generally by the numeral 132, and comprising an upright support made up of a pair of standards 134, cross-connected at 136, and pivotally connected at their lower ends to the intermediate cross member 126, that member here being in the form of a tubular shaft and the lower ends of the standards 134 having sleeves 138 journaled on that shaft. Limit means is provided for establishing two positions for the means 132. In the preferred embodiment illustrated, the right-hand sleeve 138 is notched at 140 and the notch is defined by a pair of terminal ends 142 and 144. The notch cooperates with a radial lug 146 fixed to the journal or cross member 126 to limit swinging of the means 132 in opposite directions. A pin 148 passed through the journal 126 and engaging the inner side of the right-hand sleeve 138 prevents axial displacement of the means 132 to the left. The key 146 prevents axial displacement thereof to the right. The terminal portions 142 and 144 on the sleeve 138 thus constitute front and rear stops selectively cooperative with the stop afforded by the lug 146 to establish rear and front positions of the means 132 as illustrated in Fig. 4, wherein it will be seen that the means 132 is movable angularly between a rear position (full lines) and a front position (dotted lines). The angular spacing of the stops is such that the angular distance between the means 132 in its rear position and a line perpendicular to the base and intersecting the shaft or journal 126 exceeds the angular distance between this line and the means 132 in its front position. Specifically, the angular distances are 25° to the rear and 20° to the front; although, these may be varied to suit individual cases.

The means 132 is completed by an upper portion in the form of a transverse angle member 150 having a pair of depending legs 152 telescopically received respectively by the standards 134, the latter being tubular for that purpose.

The height of the upper portion 150 of the means 136 may be adjusted relative to the lower portion by any appropriate adjusting means, here shown as comprising threaded lower end portions on the legs 152 and adjusting nuts 154 threaded thereon.

Figure 2:
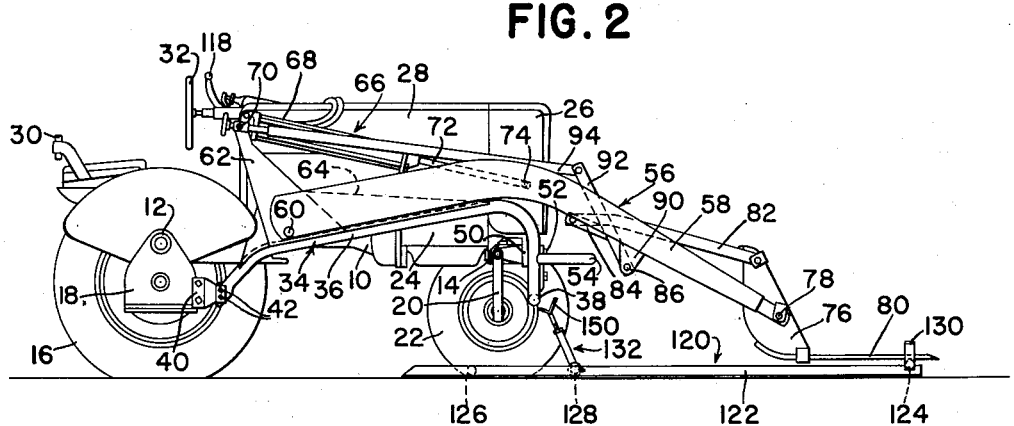
Fig. 2 is a side elevational view of the loader, with the near front and rear wheels removed, illustrating the initial position of the combination with respect to the ground-borne parking stand.
Figure 3:
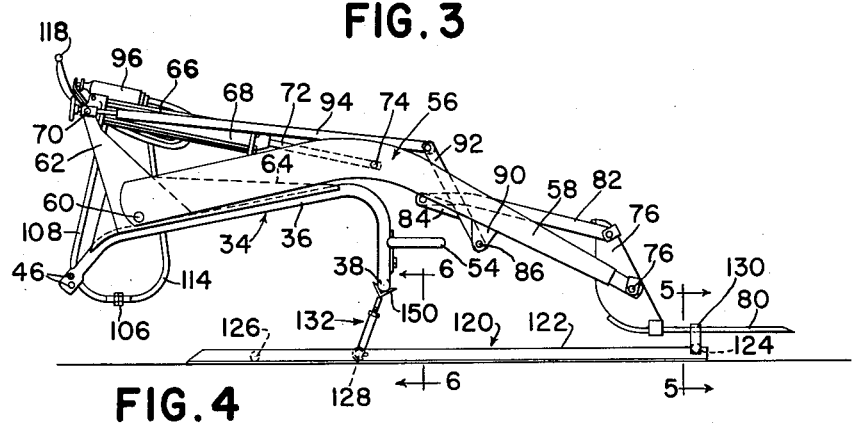
Fig. 3 illustrates the stand-supported dismounted loader or implement.

In the use of the parking stand, the stand is laid upon the ground in a position to be approached by the forwardly driven tractor-mounted loader. The means 132 is moved to its initial or rear position (Fig. 2, and full lines in Fig. 4). As the loader is driven forward with the bucket 76 in lowered position, the tines 80 enter the receiving means established by the loops 130. The rearward spacing of the means 132 relative to the means 130 is on the order of the spacing between the bucket 76 and the transverse member or bight 38 of the loader frame structure 34; although, the latter is a little longer so that the tines clearly enter the receiving means 130 before the transverse member 138 engages the upper portion 150 of the means 132. It will be noted that the upper portion or angle member 150 is substantially at the operating level of the frame 34; that is to say, it is at the operating level of the transverse member 38, which is the portion of the frame 34 received by the means 132. As the tractor-mounted loader continues forwardly, the transverse member 38 engages the upright flange of the angle member or upper portion 150 (Fig. 4) and, as the means 132 swings over center, the lower flange of the member 150 engages behind the member 38 (Fig. 3). As the member 138 swings through its over-center position, the member 150 travels, of course, in an arc. This imparts to the means 132 a slight elevation so that strain on the attaching bolts 52 is relieved. Moreover, the ultimate or front position of the means 132 (dotted lines, Fig. 4) is at a lesser angular distance ahead of the perpendicular line, as already indicated, than the rear position, which means that the member 150 in its front position is slightly higher than the member 150 in its rear position. This substantially maintains the relief on the attaching means 52 so that these means can be readily removed.

Figure 7:
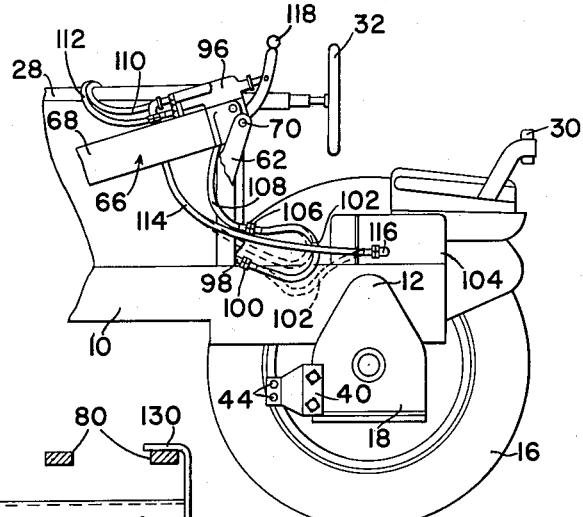
Fig. 7 is a fragmentary side elevational view, on an enlarged scale over that of Fig. 2, illustrating the hydraulic connections to the power means for adjusting the elevation of the loader lift means.
Figure 5:
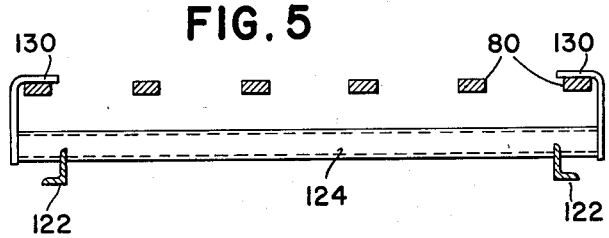
Fig. 5 is a sectional view, on an enlarged scale, as seen along the line 5—5 of Fig. 3.
Figure 6:
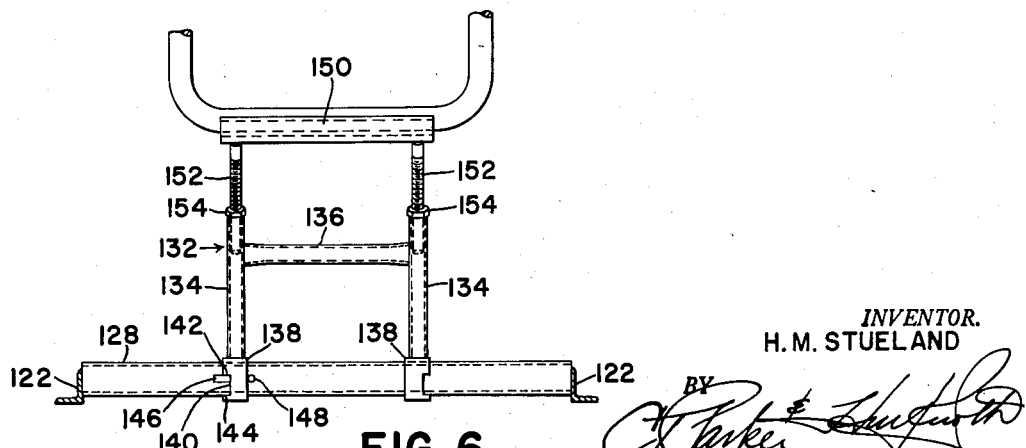
Fig. 6 is a sectional view, on the scale of Fig. 5, as seen along the line 6—6 of Fig. 3.

Since the bucket 76 is locked to the lift means 56 by means of the linkage 82—84, there can be no pivoting about the bucket axis 78. Furthermore, the hydraulic motors 66 are locked by returning the valve 96 to neutral. Consequently, there can be no pivoting between the lift means 56 and the loader frame structure 34. Therefore, upon removal of the attaching means 52 and 42, the loader will be in a position to be supported clear of the ground and free of the tractor so that the tractor may be backed out of the U-shaped frame structure 34. In the event that it is necessary to vary the angular relationship between the frame 34 and lift means 56, for the purpose of facilitating release of the attaching means 42, the hydraulic system may be utilized, since at that time the system is still connected to the tractor. After appropriate disconnection of the means 42 and 52 has been accomplished, the fluid lines 108 and 114 may be disconnected from the tractor. This procedure is illustrated in Figs. 3 and 7. The reservoir line 114 from the valve to the housing 104 is disconnected at 116 and the pressure line 102 is disconnected from the line 108 at the coupling 106. The coupling 106 is then used to connect the lines 108 and 114 (Fig. 3, and dotted lines in Fig. 7). In order to restore the basic hydraulic system of the tractor, the line 102 is connected to the housing 104 by means of the coupling 106 (dotted lines in Fig. 7) and the hydraulic mechanism in the housing 104 may be used independently of the loader, it having been previously incapacitated because of connection of the lines as shown in full lines in Fig. 7.

After the hydraulic disconnections have been effected, the tractor may be backed away and used for other purposes. The reason for interconnecting the lines 108 and 114 is to prevent the entrance of dirt and to also prevent the leakage of fluid from the lines, which may readily occur, since even though the valve is in its neutrol position, the lines will contain a certain amount of fluid.

It may be found in some instances that after a prolonged period of storage of the stand-supported loader, leakage of the hydraulic fluid through gaskets or elsewhere will result in a slight lowering of the rear end of the frame 34. Thus, when the tractor is driven into position to have the loader re-mounted thereon, it will be found that the rear ends of the side frame members 36 of the frame 34 are too low to be readily received by the brackets 40 on the depending axle housings 18. However, this is not a major difficulty, since the hose lines may be appropriately connected as in full lines in Fig. 7 and the hydraulic system used to adjust the position of the rear ends of the members 36 until they are in alinement with the respective attaching brackets 40. After the mechanical connections at 42 and 52 have been made, in addition to the hydraulic connections just referred to, the tractor and mounted loader may be backed away from the stand. As this occurs, the member 38, being in engagement with the rear flange of the member 150 of the means 132, will cause the means to rock from its position of Fig. 3 to its initial position of Fig. 2. At the same time, the tines 80 of the bucket are withdrawn from the receiving means 130. Consequently, the stand is restored to its initial position for subsequent use.

As will be seen, the stand is of simple construction and comprises only a relatively few parts, only the means 132 being movable. Therefore, the problems of maintenance are negligible. The only thing that may be required from time to time is an adjustment of the upper portion 150 relative to the lower portion of the means 138, which may be occasioned because of variations in the ground on which the stand is supported. For example, if the stand is supported on the bare ground, without any concrete foundation or the like, it may be found that seasonal changes will cause variations in the height of the means 132 above the ground as respects the height of the tractor body, since the ground on which the stand is supported may be higher or lower than that portion of the ground over which the tractor is driven into position relative to the stand. Changes in relative heights may also occur, obviously, because of inflation pressures in the tractor tires. These may all be accomplished by the simple adjusting means at 154.

While the means 130 serves as an anchor for the bucket, the means 132 functions as a fulcrum, particularly as respects adjustment of the dismounted frame and lift means by the motors 66. But, in the present case, the majority of the weight of the loader is rearwardly of the frame member 38 and is thus rearwardly of the means 132. However, the length of the stand or base behind the means 132 is such that the stand and supported loader cannot tilt rearwardly and downwardly.

Other features of the invention not specifically enumerated herein will undoubtedly occur to those versed in the art, as will numerous modifications and changes in the preferred embodiment of the invention disclosed, all of which may be achieved without departing from the spirit and scope of the invention.

What is claimed is:

1. A parking stand for use with a tractor-implement unit of the type in which an implement frame having front and rear portions is disconnectibly sustained by the tractor at an operating level above the ground and wherein the frame carries an implement part projecting ahead of the frame front portion and adjustable about a transverse axis adjacent to the rear frame portion for movement between ground-proximate and raised positions by selectively lockable adjusting means operative between the implement part and the frame, said stand comprising: a base having front and rear ends and adapted to rest on the ground to be approached from the rear by the forwardly driven tractor; first means on the base adjacent to the front end of the base and facing rearwardly to releasably receive and engage the ground-proximate implement part; and second means on the base spaced rearwardly of the first means and including an upper portion positioned substantially at the operating level of the frame to receive the frame front portion and to sustain said portion at said level upon disconnection of the frame portions from the tractor so that when the tractor is backed away from the stand-supported frame the rear portion of the frame projects as a cantilever from the front portion of the frame as fulcrumed on the second means, with said first means serving as an anchor for holding the frame and implement part against rearward and downward tilting about the second means when the adjusting means is locked.

2. The invention defined in claim 1, in which: the second means is shiftable forwardly from an initial frame-receiving position to an ultimate frame-sustaining position and its upper portion projects into the path of the forwardly moving tractor-supported front frame portion to be engaged by the said front frame portion and to be moved thereby from its initial position to its ultimate position, said second means including provision for slightly elevating its upper portion as it moves to its ultimate position for relieving tractor-frame connections of at least part of the weight of the frame whereby disconnection of the tractor from the frame portions is facilitated.

3. The invention defined in claim 1, in which: said second means comprises a standard having the aforesaid upper portion to receive the front frame portion and further having a lower portion including a pivotal mounting on the base on a transverse axis for forward swinging of the upper portion from an initial frame-receiving position to an ultimate frame-sustaining position; and limit means cooperative between the base and the standard and providing angularly spaced rear and front stops for establishing the initial and ultimate positions respectively behind and ahead of a line perpendicular to the base and intersecting said last named axis.

4. The invention defined in claim 3, in which: the angular spacing of the stops is such that the angular distance between the rear stop and said perpendicular line exceeds that between said line and the front stop.

5. The invention defined in claim 3, in which: the pivotal mounting of the standard includes a transverse journal fixed to the base; the lower portion of the standard comprises a sleeve surrounding and rockable on the journal; the sleeve has a notch therein at one end including angularly spaced apart terminal portions established by the front and rear stops; and a radial lug fixed to the journal projects into the notch to be engaged selectively by said terminal portions.

6. The invention defined in claim 1, in which: the base comprises a pair of transversely spaced, fore-and-aft extending side members and front, rear and intermediate cross members fixing said side members in spaced relation; the intermediate cross member comprises a shaft fixed at opposite ends to the side members; the means for receiving the frame comprises a standard rockably mounted at its lower end on the shaft for fore-and-aft swinging of its upper portion; and stop means cooperative between the standard and the base and limiting swinging of the standard to a range between a rear position just behind and a front position just ahead of a line perpendicular to the base and intersecting the axis of the shaft.

References Cited in the file of this patent

UNITED STATES PATENTS

| | | |
|---|---|---|
| 2,417,560 | McNamara | Mar. 18, 1947 |
| 2,432,589 | Sauder | Dec. 16, 1947 |
| 2,495,143 | Simmonds | Jan. 17, 1950 |